US009972013B2

(12) United States Patent
Howe (10) Patent No.: US 9,972,013 B2
(45) Date of Patent: May 15, 2018

(54) INTERNET SITE AUTHENTICATION WITH PAYMENTS AUTHORIZATION DATA

(71) Applicant: MASTERCARD INTERNATIONAL INCORPORATED, Purchase, NY (US)

(72) Inventor: Justin X. Howe, Oakdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 757 days.

(21) Appl. No.: 13/967,632

(22) Filed: Aug. 15, 2013

(65) Prior Publication Data
US 2015/0052053 A1 Feb. 19, 2015

(51) Int. Cl.
G06Q 40/00 (2012.01)
G06Q 20/40 (2012.01)

(52) U.S. Cl.
CPC ........... *G06Q 20/409* (2013.01); *G06Q 20/40* (2013.01)

(58) Field of Classification Search
CPC ...................................................... G06Q 40/00
USPC ...................................................... 705/35, 38
See application file for complete search history.

(56) References Cited

U.S. PATENT DOCUMENTS

| | | | |
|---|---|---|---|
| 6,112,183 A * | 8/2000 | Swanson | G06F 19/327 705/2 |
| 6,324,525 B1 * | 11/2001 | Kramer | G06Q 20/00 705/40 |
| 6,332,134 B1 * | 12/2001 | Foster | G06Q 20/02 705/36 R |
| 7,100,049 B2 | 8/2006 | Gasparini et al. | |
| 7,356,516 B2 * | 4/2008 | Richey | G06Q 10/087 705/14.51 |
| 7,392,201 B1 * | 6/2008 | Binns | G06F 19/328 600/300 |
| 7,657,441 B2 * | 2/2010 | Richey | G06Q 10/087 705/1.1 |
| 7,765,481 B2 | 7/2010 | Dixon et al. | |
| 7,822,620 B2 | 10/2010 | Dixon et al. | |
| 7,831,611 B2 | 11/2010 | Roberts et al. | |
| 7,870,203 B2 | 1/2011 | Judge et al. | |
| 8,196,206 B1 | 6/2012 | Gartside et al. | |
| 8,205,255 B2 | 6/2012 | Benea et al. | |
| 8,321,791 B2 | 11/2012 | Dixon et al. | |
| 8,370,407 B1 | 2/2013 | Devarajan et al. | |
| 8,381,289 B1 | 2/2013 | Pereira et al. | |

(Continued)

*Primary Examiner* — Kirsten Apple
(74) *Attorney, Agent, or Firm* — Ohlandt, Greeley, Ruggiero & Perle, L.L.P (57) ABSTRACT

A system for identification by a payment cardholder of phishing and/or deceptive Websites is provided. The system includes an electronic storage device having a database of merchant or financial institution Website registration with a payment card network information stored therein. The system includes an access path for allowing access to the merchant or financial institution Website registration with a payment card network information. The system includes a processor for assembling the merchant or financial institution Website registration with a payment card network information in the database, and for communicating the assembled merchant or financial institution Website registration with a payment card network information to a payment cardholder that has been granted access to the database.

21 Claims, 5 Drawing Sheets

(56) References Cited

U.S. PATENT DOCUMENTS

| | | | |
|---|---|---|---|
| 8,538,806 B2* | 9/2013 | Kuznetsov | G06Q 20/0855 705/14.1 |
| 2002/0042776 A1 | 4/2002 | Woo et al. | |
| 2002/0128917 A1* | 9/2002 | Grounds | G06Q 20/00 705/26.1 |
| 2003/0014353 A1 | 1/2003 | Fitzherbert | |
| 2004/0153399 A1* | 8/2004 | Wilkes | G06Q 20/10 705/39 |
| 2008/0147550 A1* | 6/2008 | Morsillo | G06Q 20/40 705/44 |
| 2008/0183591 A1* | 7/2008 | Olsson | G06Q 30/0601 705/26.1 |
| 2008/0183622 A1* | 7/2008 | Dixon | G06Q 20/027 705/44 |
| 2008/0196098 A1* | 8/2008 | Cottrell | H04L 63/0414 726/12 |
| 2008/0235385 A1 | 9/2008 | Li | |
| 2009/0048877 A1* | 2/2009 | Binns | G06F 19/328 705/4 |
| 2009/0164365 A1* | 6/2009 | Dragt | G06Q 20/10 705/38 |
| 2010/0299253 A1* | 11/2010 | Patterson | G06Q 10/06 705/40 |
| 2010/0325406 A1* | 12/2010 | Ukeda | G06F 9/4416 713/2 |
| 2011/0145103 A1* | 6/2011 | Ljunggren | G06Q 30/04 705/27.1 |
| 2011/0179141 A1* | 7/2011 | Ravichandran | G06Q 10/06 709/218 |
| 2011/0320347 A1* | 12/2011 | Tumminaro | G06Q 20/0855 705/39 |
| 2012/0110055 A1* | 5/2012 | Van Biljon | G06Q 30/04 709/201 |
| 2012/0116937 A1* | 5/2012 | Van Biljon | G06Q 30/04 705/34 |
| 2012/0185942 A1 | 7/2012 | Dixon et al. | |
| 2012/0209768 A1* | 8/2012 | Nuzzi | G06Q 40/02 705/44 |
| 2012/0209772 A1* | 8/2012 | Nuzzi | G06Q 20/40 705/44 |
| 2012/0227110 A1 | 9/2012 | Gartside et al. | |
| 2012/0240228 A1 | 9/2012 | Alperovitch et al. | |
| 2012/0271949 A1* | 10/2012 | Radhakrishnan | H04L 67/322 709/226 |
| 2012/0330711 A1* | 12/2012 | Jain | G06Q 30/04 705/7.23 |
| 2012/0330787 A1* | 12/2012 | Hanson | G06Q 20/00 705/26.41 |
| 2013/0014020 A1 | 1/2013 | Dixon et al. | |
| 2013/0339165 A1* | 12/2013 | Calman | G06Q 30/06 705/16 |
| 2013/0339226 A1* | 12/2013 | Kuznetsov | G06Q 20/0855 705/39 |
| 2015/0281340 A1* | 10/2015 | Lea | H04L 12/1818 709/204 |

* cited by examiner

INTERNET SITE AUTHENTICATION WITH PAYMENTS AUTHORIZATION DATA

RELATED APPLICATION

This application is related to U.S. patent application Serial No. (0009166USU1/4450), filed on an even date herewith; which is incorporated herein by reference.

BACKGROUND OF THE DISCLOSURE

1. Field of the Disclosure

The present disclosure relates to methods and systems for identification by a payment cardholder of phishing and/or deceptive Websites. In particular, in the methods and systems of this disclosure, a payment cardholder uses a proxy interaction to determine whether a merchant Website is registered with a payment card network.

2. Description of the Related Art

In the field of computer security, phishing is the criminally fraudulent process of attempting to acquire sensitive information such as usernames, passwords and credit card details by masquerading as a trustworthy entity in an electronic communication. Communications purporting to be from popular social Websites, auction sites, online payment processors or IT administrators are commonly used to lure the unsuspecting public. Phishing is typically carried out by e-mail or instant messaging, and it often directs users to enter details at a fake Website whose look and feel are almost identical to the legitimate one. Even when using server authentication, it may require tremendous skill to detect that the Website is fake.

As the Internet and electronic mail ("e-mail") continues to be utilized by an ever increasing number of users, so does fraudulent and criminal activity via the Internet and e-mail increase. Phishing is becoming more prevalent and is a growing concern that can take different forms. For example, a "phisher" can target an unsuspecting computer user with a deceptive e-mail that is an attempt to elicit the user to respond with personal and/or financial information that can then be used for monetary gain. Often a deceptive e-mail may appear to be legitimate or authentic, and from a well-known and/or trusted business site. A deceptive e-mail may also appear to be from, or affiliated with, a user's bank or other creditor to further entice the user to navigate to a phishing Website.

A deceptive e-mail may entice an unsuspecting user to visit a phishing Website and enter personal and/or financial information which is captured at the phishing Website. For example, a computer user may receive an e-mail with a message that indicates a financial account has been compromised, an account problem needs to be attended to, and/or to verify the user's credentials. The e-mail will also likely include a clickable (or otherwise "selectable") link to a phishing Website where the user is requested to enter private information such as an account number, password or PIN information, mother's maiden name, social security number, credit card number, and the like. Alternatively, the deceptive e-mail may simply entice the user to reply, fax, IM (instant message), e-mail, or telephone with the personal and/or financial information that the requesting phisher is attempting to obtain.

Phishing is a substantial problem for payment cardholders, although tools such as McAfee's Site Advisor offer a blacklisting approach to the problem. The underlying problem is that anyone can obtain an Internet domain name, there are many tricks to confuse a payment cardholder into accessing an illegitimate webpage, and it is difficult to prevent a site from spoofing a legitimate one.

Thus, there exists a need to provide enhanced security for payment cardholders when accessing Websites.

SUMMARY OF THE DISCLOSURE

Rather than attempt to solve the problem as in the prior art, this disclosure provides more stringent registration requirements attached to payment card acceptance on the Internet. It is very difficult to accept payment cards on the Internet. There is a chain of financial intermediaries that monitor all such connections and there are legal requirements that oversee these Website owners. Unfortunately, it cannot be assumed that a Website is connected to a payment network based on its appearance because it may be spoofed in order to appear like a legitimate site. Accordingly, it is necessary to conduct a transaction and receive the processing response in order to verify whether it is connected to a payment network.

A method and system for identification by a payment cardholder of phishing Websites are disclosed.

In accordance with the method of this disclosure, a payment cardholder uses a proxy interaction to determine whether a merchant Website is registered with a payment card network.

In an embodiment, the method of this disclosure involves initiating a proxy interaction of a payment cardholder computer system executing a browser application with an item of content associated with the merchant Website. A payment card network connected to the merchant Website is provided. The proxy interaction is used to determine whether the merchant Website is registered with the payment card network.

In another embodiment, the method of this disclosure involves initiating a first interaction of a payment cardholder computer system executing a browser application with an item of content associated with a merchant Website. Before allowing completion of the first interaction, the method involves initiating a proxy interaction of a payment cardholder computer system executing a browser application with an item of content associated with the merchant Website. A payment card network connected to the merchant Website is provided. The proxy interaction is used to determine whether the merchant Website is registered with the payment card network.

In yet another embodiment, the method of this disclosure involves initiating an interaction of a payment cardholder computer system executing a browser application with an item of content associated with a merchant Website or a financial institution Website. Before allowing completion of the interaction, the method involves determining from the browser application whether the merchant Website or the financial institution Website is registered with a payment card network. The browser application contains a database of merchant Website registration with a payment card network information and of financial institution Website registration with a payment card network information.

In another embodiment, the method of this disclosure involves initiating an interaction of a payment cardholder computer system configured for communication with a Domain Name System (DNS) server with an item of content associated with a merchant Website or a financial institution Website. Before allowing completion of the interaction, the method involves determining from the Domain Name System (DNS) server whether the merchant Website or the financial institution Website is registered with a payment card network. The Domain Name System (DNS) server contains a database of merchant Website registration with a payment card network information and of financial institution Website registration with a payment card network information.

In a further embodiment, the system of this disclosure includes an electronic storage device having a database of merchant Website registration with a payment card network information and of financial institution Website registration with a payment card network information stored therein. The system includes an access path for allowing access to the merchant Website registration with a payment card network information and financial institution Website registration with a payment card network information. The system includes a processor for assembling the merchant Website registration with a payment card network information and financial institution Website registration with a payment card network information in the database, and for providing the assembled merchant Website registration with a payment card network information and financial institution Website registration with a payment card network information to a payment cardholder that has been granted access to the database.

These and other systems, methods, objects, features, and advantages of the present disclosure will be apparent to those skilled in the art from the following detailed description of the embodiments and the drawings.

DESCRIPTION OF THE EMBODIMENTS

The systems and methods described herein provide for detecting whether a referenced URL corresponds to a phishing Website. In particular, the systems and methods of this disclosure use a proxy interaction to determine whether a merchant Website or a financial institution Website is registered with a payment card network.

Phishing detection and notification can be implemented in accordance with this disclosure to minimize phishing attacks by detecting and warning payment cardholders when a computer user visits a known or suspected phishing Website. Similarly, a fraudulent or phishing Website can include any form of a deceptive Web page that may include spoofed content, phishing content, and/or fraudulent requests for private, personal, and/or financial information.

In accordance with this disclosure, embodiments relate to protecting payment cardholders against phishing and/or deceptive sites. Many Websites may attempt to trick the user into thinking the user is on a different Website from that the user really may be on or to take advantage of users who inadvertently go to the wrong Website. For example, users can be tricked into providing their bank account numbers if they go to a Website that looks like their actual bank but which may be a fraudulent Website. Users can also be confused by Websites that attempt to look like other popular branded Websites and trick the user into using the wrong Website.

Web crawling may involve the process of automatically visiting Websites and fetching the Web pages on those sites. In embodiments of this disclosure, Web crawling can be used in order to analyze the content on the Websites.

A payment cardholder computer system in which embodiments of phishing detection and notification can be implemented, includes any number of payment cardholder computer devices configured for communication with a server device (i.e., a Domain Name System (DNS) server) via a communication network, such as an intranet or the Internet. A payment cardholder computer system can be implemented as any form of computing or electronic device with any number and combination of differing components as described herein.

In an implementation of an exemplary payment cardholder computer system, any one or more of the payment cardholder computer devices can implement a Web browsing application to generate a Web browser user interface for display on a display device. A Web browsing application can include a Web browser, a browser plug-in, a browser add-on or extension, a browser toolbar, or any other application that may be implemented to browse the Web and Web pages. The Web browser user interface facilitates payment cardholder communication and interaction with other computer users and devices via the communication network.

Any one or more of the payment cardholder computer devices can include various Web browsing application(s) that can be modified or implemented to facilitate Web browsing, and which can be included as part of a data path between a payment cardholder computer device and the communication network (e.g., the Internet). The Web browsing application(s) can implement various embodiments of phishing detection and notification and include a Web browser application, a firewall, an intranet system, and the like. Any number of other various applications can be implemented in the data path to facilitate Web browsing and to implement phishing detection and notification.

The payment cardholder computer system also includes any number of other computing device(s) that can be connected via a communication network (e.g., the Internet) to the server device and/or to any number of the payment cardholder computer devices. A computing device can host a phishing Website that an unsuspecting user at a payment cardholder computer device may navigate to from a selectable link in a deceptive e-mail. Once at the phishing Website, the unsuspecting user may be elicited to provide personal, confidential, and/or financial information (also collectively referred to herein as "private information"). Private information obtained from a user is typically collected at a phishing Website (e.g., at computing device) and is then sent to a phisher at a different Website or via e-mail where the phisher can use the collected private information for monetary gain at the user's expense.

The computer and network architectures useful in this disclosure can be implemented with numerous other general purpose or special purpose computing system environments or configurations. Examples of well known computing systems, environments, and/or configurations that can be suitable for use include, but are not limited to, personal computers, server computers, computer devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment includes a general-purpose computing system in the form of a computing device. The components of computing device can include, but are not limited to, one or more processors (e.g., any of microprocessors, controllers, and the like), a system memory, and a system bus that couples the various system components. The one or more processors process various computer executable instructions to control the operation of computing device and to communicate with other electronic and computing devices. The system bus represents any number of several types of bus structures, including a memory bus or memory controller, a peripheral bus, an accelerated graphics port, and a processor or local bus using any of a variety of bus architectures.

Computing environment includes a variety of computer readable media which can be any media that is accessible by computing device and includes both volatile and non-volatile media, removable and non-removable media. The system memory includes computer readable media in the form of volatile memory, such as random access memory (RAM), and/or non-volatile memory, such as read only memory (ROM). A basic input/output system (BIOS) maintains the basic routines that facilitate information transfer between components within computing device, such as during start-up, and is stored in ROM. RAM typically contains data and/or program modules that are immediately accessible to and/or presently operated on by one or more of the processors.

Computing device can include other removable/non-removable, volatile/non-volatile computer storage media. By way of example, a hard disk drive reads from and writes to a non-removable, non-volatile magnetic media, a magnetic disk drive reads from and writes to a removable, non-volatile magnetic disk (e.g., a "floppy disk"), and an optical disk drive reads from and/or writes to a removable, non-volatile optical disk such as a CD-ROM, digital versatile disk (DVD), or any other type of optical media. A hard disk drive, magnetic disk drive, and optical disk drive can each be connected to the system bus by one or more data media interfaces. The disk drives and associated computer readable media provide non-volatile storage of computer readable instructions, data structures, program modules, and other data for computing device.

Any number of program modules can be stored on RAM, ROM, hard disk, magnetic disk, and/or optical disk, including by way of example, an operating system, one or more application programs, other program modules, and program data. Each of such operating system, application program(s), other program modules, program data, or any combination thereof can include one or more embodiments of the systems and methods described herein.

Computing device can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A payment cardholder can interface with computing device via any number of different input devices such as a keyboard and pointing device (e.g., a "mouse"). Other input devices can include a microphone, joystick, game pad, controller, satellite dish, serial port, scanner, and/or the like. These and other input devices are connected to the processors via input/output interfaces that are coupled to the system bus, but can be connected by other interface and bus structures, such as a parallel port, game port, and/or a universal serial bus (USB).

A display device (or other type of monitor) can be connected to the system bus via an interface, such as a video adapter. In addition to the display device, other output peripheral devices can include components such as speakers and a printer which can be connected to computing device via the input/output interfaces.

Computing devices can operate in a networked environment using logical connections to one or more remote computers, such as remote computing device. By way of example, remote computing devices can be a personal computer, portable computer, a server, a router, a network computer, a peer device or other common network node, and the like. The remote computing devices can be illustrated as portable computers that can include any number and combination of the different components, elements, and features described herein relative to computing devices.

Logical connections between computing device and the remote computing device are depicted as a local area network (LAN) and a general wide area network (WAN). Such networking environments are commonplace in offices, enterprise-wide computer networks, intranets, and the Internet. When implemented in a LAN networking environment, the computing device is connected to a local network via a network interface or adapter. When implemented in a WAN networking environment, the computing device typically includes a modem or other means for establishing communications over the wide area network. The modem can be internal or external to computing device, and can be connected to the system bus via the input/output interfaces or other appropriate mechanisms.

Figure 1:
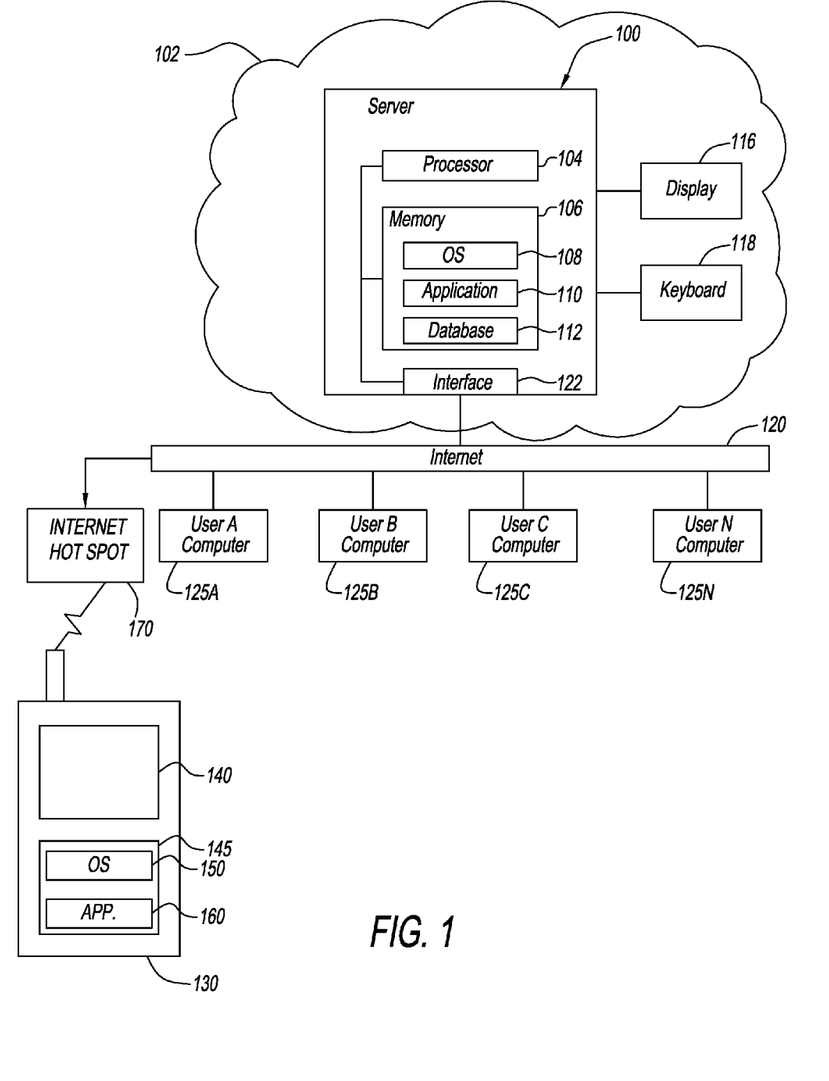
FIG. 1 is a diagram of system for implementing an exemplary embodiment of the present disclosure.

Referring to the drawings and, in particular, FIG. 1, a Website is operated on a server generally referred to by reference numeral 100. The server 100 is in the cloud 102. Server 100 is connected to the Internet 120 by an interface 122. Server 100 includes a data processor 104 and a memory 106. Server 100 is connected to a display 116 and a keyboard 118. It will be understood that server 100 can have a number of other peripheral devices customarily found in any computer, such as, for example, a CD or DVD drive, for placing programs on server 100 or devices associated with or connected to the server for creating physical records of data processed by server 100.

Memory 106 has a memory portion 108 for an operating system ("OS") for server 100, a memory portion 110 for one or more application programs, including one that is the subject of this disclosure, and a memory portion 112 used as the storage for a database.

The data of the database stored in memory portion 112 is stored in any type of memory, including a hard drive, flash memory, CD, RAM, or any other suitable memory, with provisions for suitable backup as known in the art.

Access computers 125A, 125B, 125C to 125N can access server 100 via a connection to the Internet 120.

A mobile communication device 130, such as, for example, and not by way of limitation, a telephone, has a display 140 and a memory 145 for storing an operating system 150 and a series of applications or applets therein. The series of applications or applets include an applet or application program (hereinafter an application) 160. Mobile communication device 130 can access server 100 via an Internet connected Wi-Fi hot spot 170 (or by any telephone network, such as a 3G or 4G system, on which mobile communication device 130 communicates) by using application 160. Application 160 can include MasterPass™ capability so that Internet purchases are quickly and easily completed. It is preferable that application 160 be a relatively thin application. Further, application 160 is preferably not particularly complex so that operation on a mobile device, including those devices without great computing resources, is facilitated.

Website 100 can be accessed by a payment cardholder using a computer 125A, 125B, 125C to 125N, or a mobile communication device 130. Purchases can be made by a user or consumer using an access computer 125A, 125B, 125C to 125N, or by using mobile communication device 130. However, it will be understood that Website 100 can be accessed from a home or business computer, a personal digital assistant, a game console, a home appliance such as, for example, a smart refrigerator, any other Internet connected communication device, such as, a tablet or other mobile device (for example, an iPad® or an Ultrabook), or any stationary device, such as, for example, a kiosk.

In an embodiment, the method of this disclosure involves using a proxy interaction to determine whether the merchant Website is registered with the payment card network. The proxy interaction involves accessing a merchant Website; selecting one or more items for a shopping cart at the merchant Website; proceeding to checkout with the one or more items in the shopping cart; submitting proxy payment card information to the merchant Website; and confirming receipt of the proxy interaction by the payment card network through an authorization system by recognizing the proxy payment card information submitted by a merchant.

In another embodiment, the method of this disclosure involves accessing a merchant Website; selecting one or more items for a shopping cart at the merchant Website; after determining that the merchant Website is registered with the payment card network using the proxy interaction, proceeding to checkout with the one or more items in the shopping cart; and submitting payment card information to the merchant Website. As a merchant completes authorization for the proxy interaction, the payment card network confirms receipt of the proxy interaction through an authorization system by recognizing the proxy payment card information submitted by the merchant.

In another embodiment, the method of this disclosure involves accessing a merchant Website; selecting one or more items for a shopping cart at the merchant Website; after determining that the merchant Website is not registered with the payment card network using the proxy interaction, discontinue accessing the merchant Website.

In embodiments, there can be a Web browser application and a proxy application running on the payment cardholder computing device (e.g., a personal computer). The Web browser can be configured to utilize the proxy application such as a Web proxy. A payment cardholder can attempt to access a URL using the Web browser. This access attempt can be passed to the proxy application. The proxy application can determine the legitimacy of the Web content at the URL by determining whether the merchant Website is registered with the payment card network. In embodiments, there can also be a local cache on a database such that the frequently/recently accessed content has its legitimacy, or indicia of its legitimacy, stored locally. This information can be cleared out of the cache, or modified, when new threat information is associated with stored information or there is a change in the legitimacy status of a Website, or for other such reasons.

Embodiments of the present disclosure can involve virtual credit card numbers. When a user is requested to enter a credit card by a suspect e-commerce Website, before doing so, a payment card network provides a proxy virtual credit card number to use containing fictitious information. The proxy payment card information comprises a fictitious card number, payment cardholder name and payment cardholder address. In particular, the fictitious card number can have a virtual card number (VCN) consisting of sixteen (16) numbers designed for one time use.

Alternatively, the virtual credit card number can be a valid credit card number linked to the user's actual credit card number, but with restrictions placed on it such as the length of time it is valid or the maximum charge that can be made on it. In this manner, when a user is not sure about the legitimacy or reputation of a Website, the user can use a credit card that can only allow a small amount to be charged to it and which can expire in twenty-four hours. Embodiments can involve gaining insight into any disputes filed against the merchant and on which sites users can choose to use virtual credit card numbers.

After the payment card network confirms receipt of the proxy interaction, the payment card network can notify the payment cardholder initiating the first interaction that the merchant is authorized to accept payment cards, and/or that the URL matches the merchant name on file with the payment card network. After the payment card network confirms receipt of the proxy interaction, the browser application can notify the payment cardholder initiating the first interaction by a color code or other visual cue.

Alternatively, after the payment card network confirms receipt of the proxy interaction, the payment card network can notify the payment cardholder initiating the first interaction that the merchant is not authorized to accept payment cards, and/or that the URL does not match the merchant name on file with the payment card network. After the payment card network confirms receipt of the proxy interaction, the payment card network can provide no notification to the payment cardholder initiating the first interaction. The browser application and Domain Name System (DNS) server can prevent the payment cardholder from entering any information at the merchant Website, or from engaging in any action which could compromise the payment cardholder's security.

If it is determined after the fact that a payment cardholder has visited a phishing Website, a warning message can be displayed to inform the payment cardholder that the phishing Website (or suspected phishing Website) has been visited. The payment cardholder can then make an informed decision about what to do next, such as if the payment cardholder provided any personal or financial information while at the phishing Website. This can give the payment cardholder time to notify his or her bank, or other related business, of the information disclosure and thus preclude fraudulent use of the information that can result from the disclosure of the private information.

A payment card network can initiate a number of actions, alerts, cautions, warnings and the like during a payment cardholder's interaction with a server. For example, the payment card network can initiate warnings or alerts, provide information, provide recommendations, and the like based on information accessible to the payment card network. For example, actions can involve alerts, warnings, prevention of access, or the like based on legitimacy and or behaviors. The payment card network can indicate various levels of warnings, indications, and alerts from cautionary statements to warnings and indications of danger. In embodiments, the level of warning can increase with increased participation, as, for example, when a payment cardholder interacts with a particularly non-reputable site.

The warning, alert, or other indication of legitimacy can be based on one or more parameters (e.g., one or more indicia of legitimacy collected and stored as information).

In embodiments, information can be provided indicating action or interaction is acceptable. For example, when presented with an information request on a Website, the payment card network can provide an indication to the payment cardholder that this Website has legitimacy for dealing with such information.

In embodiments, warnings can be provided with further information available. Warnings can be accompanied with available alternatives. A warning can relate to a prospective download. A warning can be a personal information warning, adware warning, spyware warning, malware warning, content warning, unwanted included file warning, cookie warning, data warning, unintended Website warning (e.g., misdirected through a similar mark), shopping warning, e-commerce warning, misuse of personal information warning, or the like. A warning can include, for example, any type of information described herein or a summary or indicator of the same.

In embodiments, the payment card network can provide a prevention service in such a way that an interaction or further interaction is not allowed or only allowed to proceed with an acknowledgement of the risk. In embodiments, such acknowledgements can be recorded for later retrieval.

In embodiments, the step of presenting legitimacy information can involve presenting audio information and or visual information. The presentation can involve presenting a warning of a poor reputation, a warning of an unknown reputation, an indication of a good reputation, or other presentation of information.

In embodiments, the presentation of legitimacy or reputation information can be provided to a payment cardholder through a mobile communication facility, mobile Web facility, desktop facility, laptop facility, PDA, cell phone, or other computing facility or device.

In embodiments, the presentation of legitimacy information involves presenting varying degrees of warnings depending on the step of interaction. For example, the information can be presented in an increasingly color coded manner as the user gets closer and closer to committing the dangerous act (ranging from a green code when the user first accesses the Website to a red code if the user hits the "submit" button to send info to a bad Website).

In an embodiment, the Domain Name System (DNS) server contains a database of merchant Website registration with a payment card network information and of financial institution Website registration with a payment card network information. Before allowing completion of an interaction of a payment cardholder computer system with an item of content associated with a merchant Website or a financial institution Website, the database of information can be used to determine whether the merchant Website or the financial institution Website is registered with a payment card network.

The Domain Name System (DNS) server contains an updated database of merchant Website registration with a payment card network information and/or of financial institution Website registration with a payment card network information. The database contains a white list of merchant Websites and financial institution Websites registered with a payment card network, and a black list of merchant Websites and financial institution Websites not registered with a payment card network.

In an embodiment of the phishing detection and notification, a history of Websites visited by a payment cardholder can be checked against a list of known phishing Websites. If a URL (Uniform Resource Locator) that corresponds to a known phishing Website is located in the history of visited Websites, the payment cardholder can be warned via an e-mail message or via a browser displayed message that the phishing Website has been visited and/or private information has been submitted. In a further embodiment, the warning message (e.g., an e-mail or message displayed through a Web browser) can contain an explanation that the phishing Website is a spoof of a legitimate Website and that the phishing Website is not affiliated with the legitimate Website.

A known phishing domain can be either a known target of phishing attacks (e.g., a legitimate business that phishers imitate), or a domain known to be a phishing domain, such as a domain that is implemented by phishers to steal information. The list of known phishing domains includes a list of known bad URLs (e.g., URLs associated with phishing Websites) and a list of suffixes of the known bad URLs. In addition, the list of known phishing domains can also include a list of known good (or legitimate) domains that are frequently targeted by phishers.

The server can publish the list of known phishing domains to the payment cardholder computer device which maintains the list as a cached list of the known phishing domains. The server can also publish a list of known non-phishing domains to the payment cardholder computer device which maintains the list as another of the cached list(s). In an alternate implementation, the payment cardholder computer device queries the server before each domain is visited to determine whether the particular domain is a known or suspected phishing domain. A response to such a query can also be cached. If a payment cardholder then visits or attempts to visit a known or suspected phishing domain, the payment cardholder can be blocked or warned. The list of known phishing domains can be updated.

The server can be able to access information of Website content associated with a URL by querying a database containing such information. This information can have been stored previously in the database by the server. In any case, the server can comprise a computer program that can perform a Web content analysis function of the database such as, without limitation, a link structure analysis; a white list comparison; a black list comparison; a heuristic; an automatic test; a dynamic analysis of an executable application or script; a static analysis of an executable application or script; an analysis of an end user license agreement; a business analysis resulting in a determination of a distinguishing characteristic of a Website, such as a business model or a genre; a Web crawl; or a machine learning operation. From time to time, the information can be updated.

In embodiments, the legitimacy of Websites, Web content, portions of Websites, etc., can also be determined through the use of a white list. For example, while determining whether a Website or an item of Web content is associated with a phishing activity, the Website or Web content can be compared to a white list of acceptable Websites or acceptable features, such as content, form, source, and so forth. The use of a white list can allow precise tuning of a heuristic of which the phishing detection process can be comprised. For another example, a process for allowing or denying Websites or features associated with Web content (such as adware, spyware, spam, phishing, pop ups, cookies, ActiveX components, payment cardholder-side scripting, uploading files, downloading files, providing personal information, and so forth) can allow a payment cardholder to add Web content to a white list to indicate that features associated with the Web content should always be allowed. The use of a white list compares favorably to common practice in which a payment cardholder either provides authorization input prior to the invocation of Web content or sets an "always allow" or "always deny" Web-wide preference. According to the present disclosure, the white list can be a real-time white list and can be updated by a facility other than the payment cardholder, thus providing real-time access to the latest white list information and eliminating stale information from the white list, all via a process that requires limited or no input from the payment cardholder.

The payment cardholder can cache information locally as it is looked up so that repeated visits to the same Website cannot require time consuming look ups. In embodiments, this cache can be stored in encrypted form to protect the data it contains from being stolen, reverse engineered, or the like. This cache can also be pre-loaded with data of the most popular Websites when the software is first installed.

Figure 2:
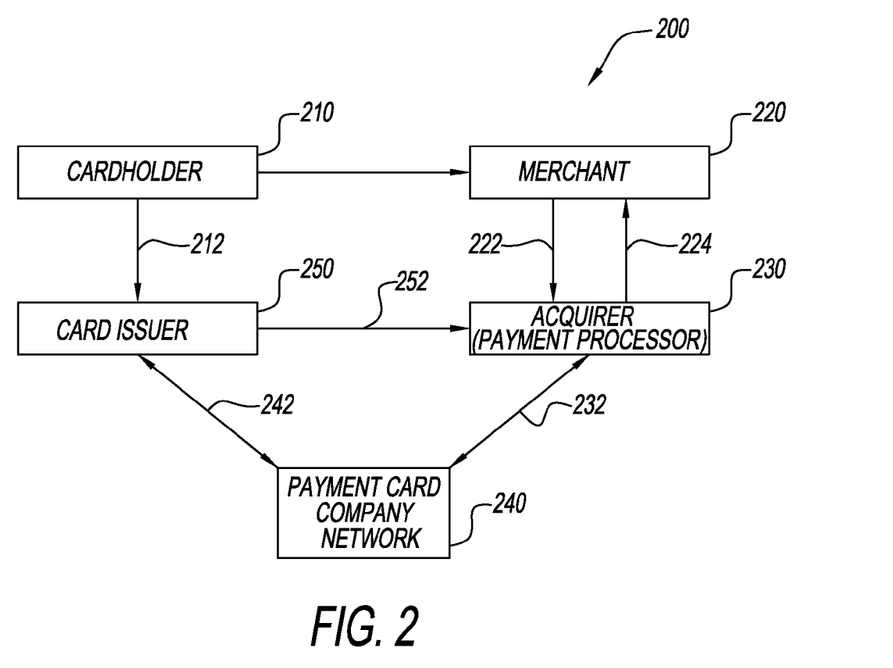
FIG. 2 is a diagram of a four party payment card system.

Referring to FIG. 2, there is shown a four party system 200. The payment cardholder 210 submits the credit card to the merchant 220. The merchant's point of sale device communicates 222 with his acquiring bank or acquirer 230, which acts as a payment processor. The acquirer 230, at 232, initiates the transaction on the payment card network 240. The payment card network 240 routes the transaction to the issuing bank or card issuer 250, which is identified using information in the transaction message. The card issuer 250 approves or denies an authorization request. At 242, the card issuer 250, then routes, via the payment card network 240, an authorization response back to the acquirer 230. The acquirer 230 sends approval to the POS device of the merchant 220. Seconds later, the payment cardholder completes the purchase and receives a receipt.

The account of the merchant 220 is credited at 224 by the acquirer 230. The card issuer 250 pays the acquirer at 252. Eventually, at 212, the payment cardholder 210 pays the card issuer 250.

Figure 3:
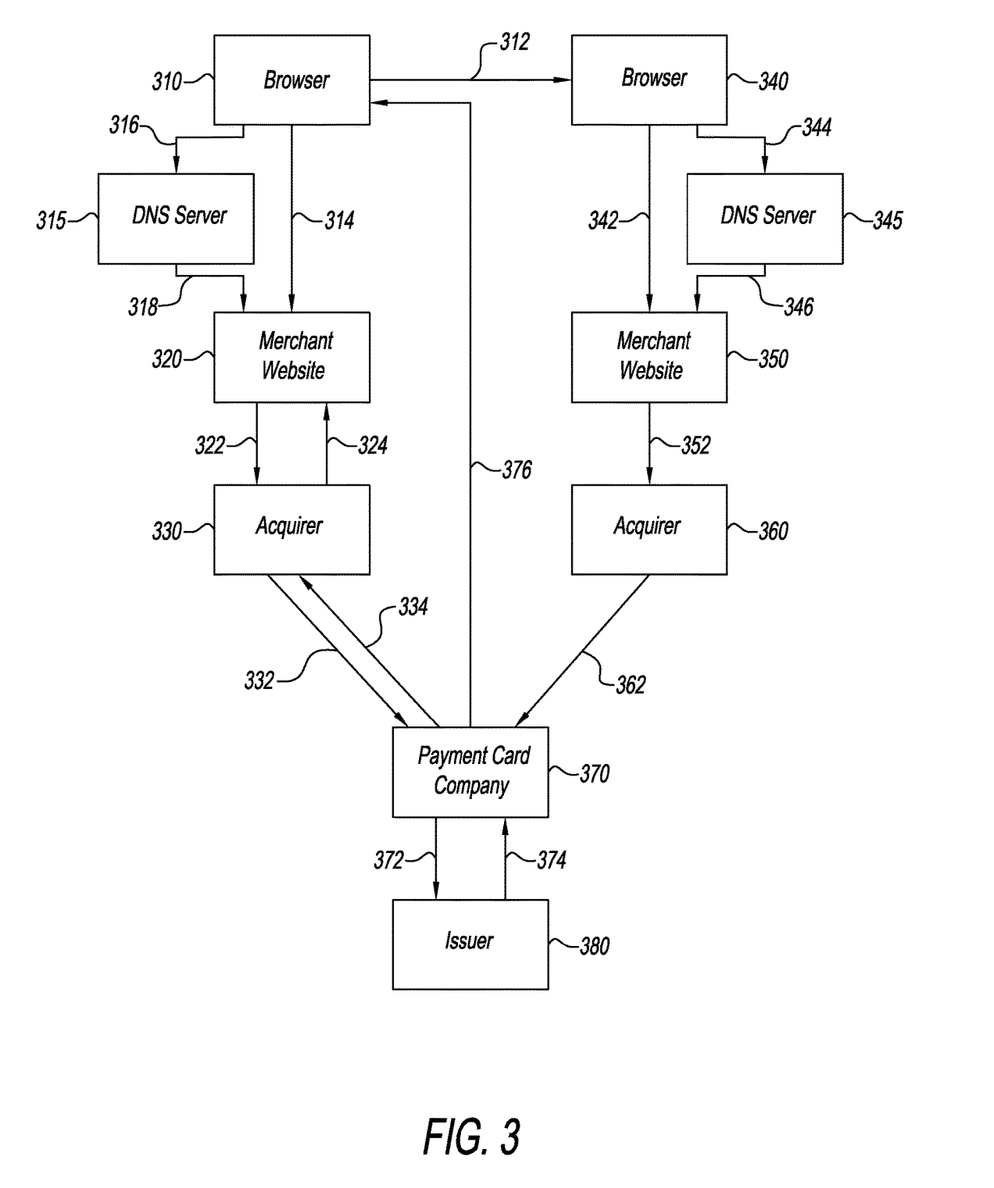
FIG. 3 is a flow chart representing the manner in which a payment cardholder uses the method of this disclosure for determining whether a merchant Website is registered with a payment card network, i.e., identifying a legitimate merchant Website.

FIG. 3 depicts an embodiment of this disclosure involving a legitimate merchant Website. Referring to FIG. 3, a web browser, browser plug-in, or browser add-on 310 opens at 314 a first session at merchant Website 320 visit. The web browser, browser plug-in, or browser add-on 340 automatically opens at 312 a proxy session at merchant Website 350 through 342 and randomly puts an object into the shopping cart. The proxy transaction proceeds to checkout with the item in the shopping cart using a fictitious card number (in this case a VCN), name and address for submission to the merchant. As the merchant completes an authorization for the proxy or fictitious transaction, the payment network can confirm receipt of the proxy fictitious transaction through the authorization system, by recognizing the VCN, fictitious address, etc. The authorization system consists of acquirer 360 which is routed at 362 to payment card company 370 which is routed at 372 to issuer 380. See FIG. 2. After such confirmation, the payment network can notify the non-fictitious browser session that the merchant is registered to accept cards. The approval authorization is from issuer 380 which is routed at 374 to payment card company 370 which is routed at 334 to acquirer 330 and on to the non-fictitious browser session. See FIG. 2. The payment card company 370 network can also notify at 376 the non-fictitious browser session that the URL matches the merchant name on file with the payment network. After receiving such digital confirmation, the browser plug-in or browser add-on 310 can notify the user by changing color (green=confirmed), or some other visual cue. As depicted in FIG. 3, merchant Website 320 and merchant Website 350 are the same site.

The web browser, browser plug-in, or browser add-on 310 can optionally be configured for communication with Domain Name System (DNS) server 315 through 316 to obtain an IP address which is then routed at 318 to merchant website 320. Likewise, for the proxy session, the web browser, browser plug-in, or browser add-on 340 can optionally be configured for communication with Domain Name System (DNS) server 345 through 344 to obtain an IP address which is then routed at 346 to merchant website 350.

The method of this disclosure can also be used to identify any payment intermediaries being used by a merchant (such as Square or Digital River), as well as merchants that are sharing the same checkout page so as to avoid fraud monitoring programs.

Figure 4:
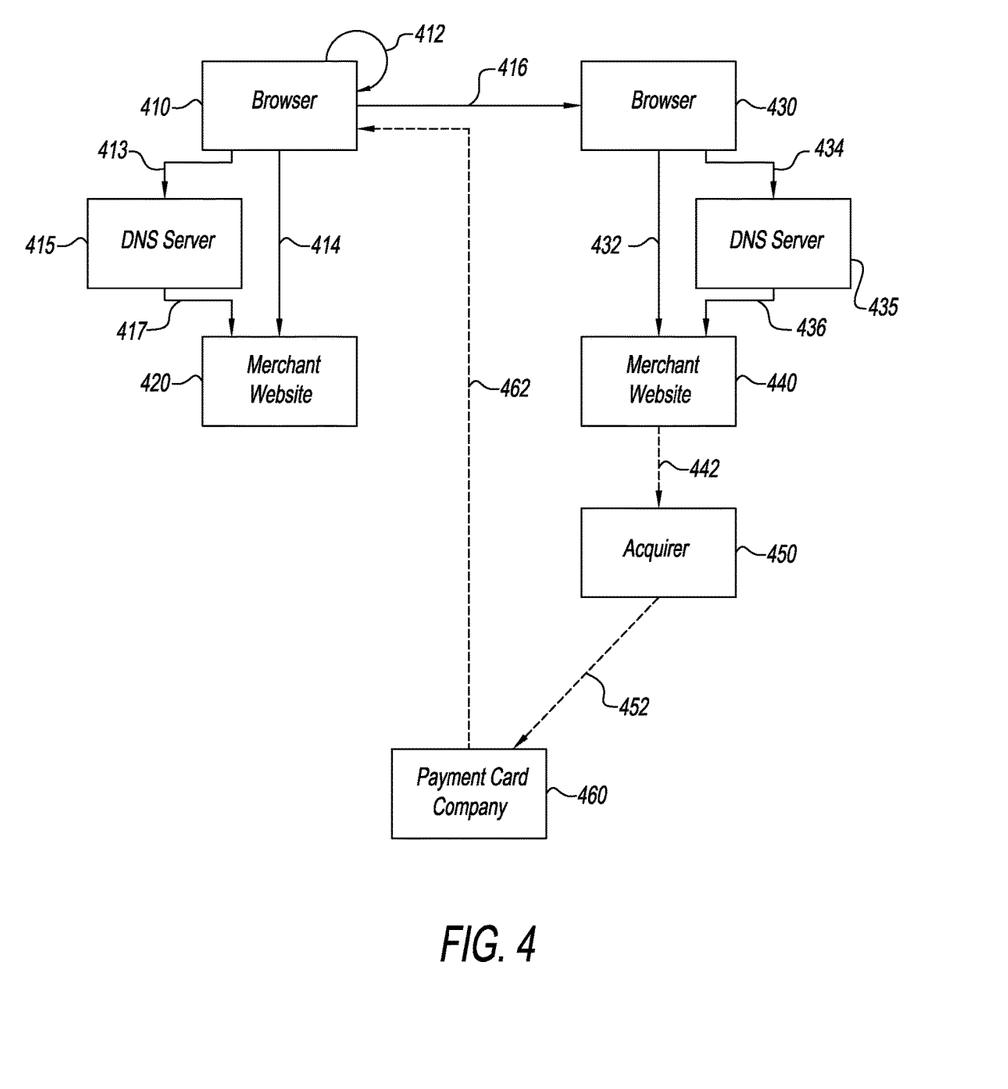
FIG. 4 is a flow chart representing the manner in which a payment cardholder uses the method of this disclosure for determining whether a merchant Website is registered with a payment card network, i.e., identifying a phishing Website.

FIG. 4 depicts an embodiment of this disclosure involving a phishing merchant Website. Referring to FIG. 4, a web browser, browser plug-in, or browser add-on 410 attempts to open at 414 a first session at merchant Website 420 visit. From an available merchant information database, merchant Website 420 is a known phishing Website, in which case the payment cardholder is prevented at 412 from entering any information or engaging in any action (such as clicking) which might compromise their security. In scenarios with unknown websites, the web browser, browser plug-in, or browser add-on 430 automatically opens at 416 a proxy session at merchant Website 440 through 432 and randomly puts an object into the shopping cart. The proxy transaction proceeds to checkout with the item in the shopping cart using a fictitious card number (in this case a VCN), name and address for submission to the merchant. As the merchant attempts to complete an authorization for the proxy or fictitious transaction, the payment network does not confirm receipt of the proxy fictitious transaction through the authorization system, by recognizing the VCN, fictitious address, etc. The authorization system consists of acquirer 450 which is routed at 452 to payment card company 460. See FIG. 2. The payment card company 460 network either does not send a confirmation to the non-fictitious browser session 410 or notifies at 462 the non-fictitious browser session that the URL does not match the merchant name on file with the payment network. After receiving such digital notification, the browser plug-in or browser add-on 410 can notify the user by changing color (red=suspicious), or some other visual cue, or by preventing the user from entering any information or engage in any action (such as clicking) which might compromise their security. As depicted in FIG. 4, merchant Website 420 and merchant Website 440 are the same site.

The broken lines 442, 452 and 462 in FIG. 4 illustrate one scenario where merchant Website 440 is connected to the payment network, but the URL does not match the merchant name registered with the payment network (in which case the broken line sequence happens). In the other scenario depicted in FIG. 4, merchant Website 420 is not connected to the payment network (in which case the broken line sequence does not happen).

The web browser, browser plug-in, or browser add-on 410 can optionally be configured for communication with Domain Name System (DNS) server 415 through 413 to obtain an IP address which is then routed at 417 to merchant website 420. If someone tries to go to a known phishing site, the Domain Name System (DNS) server 415 (which contains a database having a white list and a black list) can block the connection or repoint the internet user to a Website which indicates that they were attempting to access a phishing site. Likewise, for the proxy session, the web browser, browser plug-in, or browser add-on 430 can optionally be configured for communication with Domain Name System (DNS) server 435 through 434 to obtain an IP address which is then routed at 436 to merchant website 440.

Figure 5:
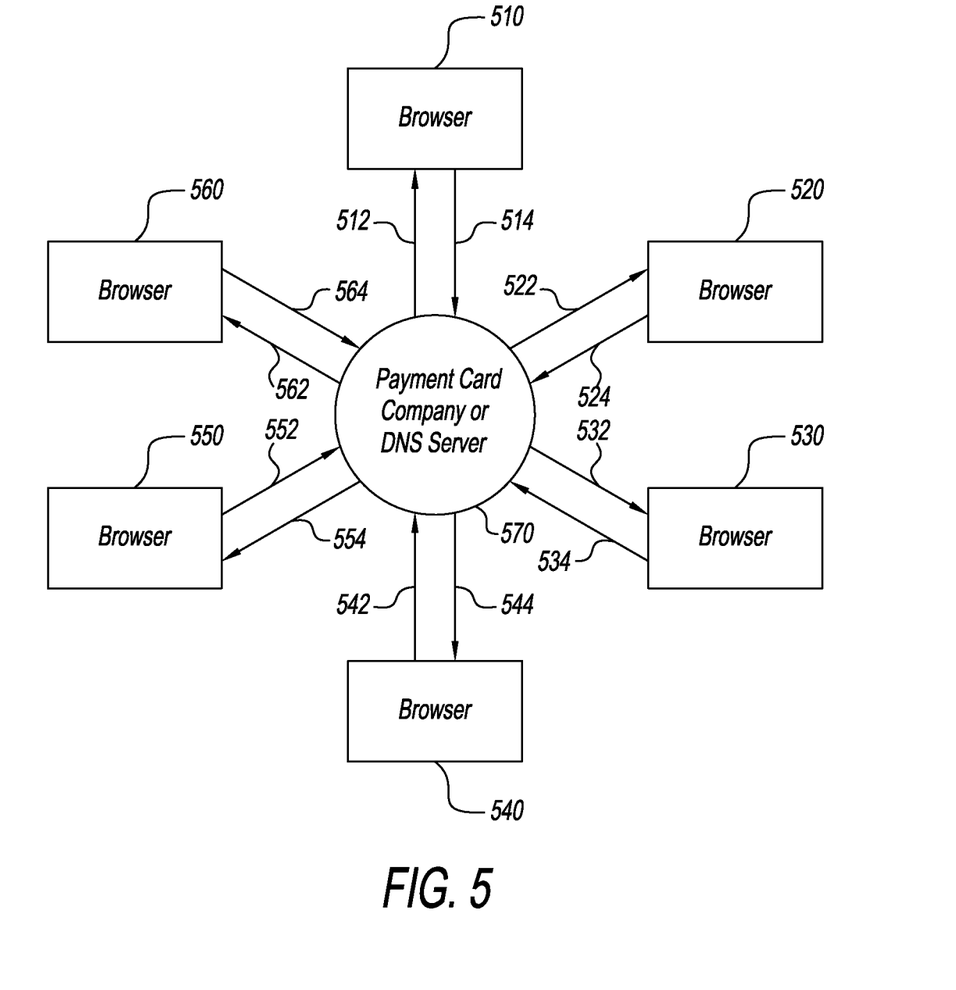
FIG. 5 is a diagram illustrating the sharing of white lists and black lists between browsers or Domain Name System (DNS) servers.

FIG. 5 depicts the sharing of white lists/black lists between browsers or DNS servers. This can be included in the database of merchant Website registration with a payment card network information and of financial institution Website registration with a payment card network information. A payment card company or DNS server 570 contains list of known phishing domains and conveys that information to the payment cardholder computer device (i.e., 510, 520, 530, 540, 550 and 560) which maintains the list as a cached list of the known phishing domains. A payment card company or DNS server 570 can also convey a list of known non-phishing domains to the payment cardholder computer device (i.e., 510, 520, 530, 540, 550 and 560) which maintains the list as another of the cached list(s). In an alternate implementation, the payment cardholder computer device queries the server before each domain is visited to determine whether the particular domain is a known or suspected phishing domain. A response to such a query can also be cached.

Queries and conveyances between payment cardholder computer device 510 and payment card company or DNS server 570 occur at 512 and 514. Queries and conveyances between payment cardholder computer device 520 and payment card company or DNS server 570 occur at 522 and 524. Queries and conveyances between payment cardholder computer device 530 and payment card company or DNS server 570 occur at 532 and 534. Queries and conveyances between payment cardholder computer device 540 and payment card company or DNS server 570 occur at 542 and 544. Queries and conveyances between payment cardholder computer device 550 and payment card company or DNS server 570 occur at 552 and 554. Queries and conveyances between payment cardholder computer device 560 and payment card company or DNS server 570 occur at 562 and 564. If a payment cardholder then visits or attempts to visit a known or suspected phishing domain, the payment cardholder can be blocked or warned. As more sites are authenticated, the URLs can be retained within the browser/plug-in/add-on or DNS server and shared as updates. In this fashion, every Website will not need a separate authorization for every visitor.

In an embodiment, unlike merchants, financial institutions do not have any products on their Website for purchase with a payment card. However, all of these institutions are registered with a payment card network, so the payment card network can collect all legitimate URLs from these financial institutions and then include the URLs by default as acceptable in the browser plug-in. The database can include both information for merchants and for financial institutions.

An aspect of the present disclosure relates to improving computer and user security and protection. Information relating to Websites can be used before, during, or after certain Website interactions as a way of predicting the reliability, safety, security, nuisance value, or other parameters of the interactions. In embodiments, systems and methods disclosed herein relate to assessing the legitimacy or reputation of a Website, page, or portion thereof, and alerting a payment cardholder of the legitimacy or reputation prior to or simultaneously with an interaction with the Website, page, or portion. For example, in addition to the proxy interaction for determining whether the merchant Website is registered with the payment card network, a particular Website, or content from the Website, can carry unwanted or unintended content as a general practice or in certain instances. A system according to the principles of the present disclosure can alert the payment cardholder of such legitimacy or reputation prior to a payment cardholder interaction with the Website or content. In other situations, Websites request information from users for a purchase, to log in, to gain information, as part of a survey, or the like, and a system according to the principles of the present disclosure can alert the user about the site's legitimacy for using such information before the user provides such information through the site.

In addition to merchant Website registration with a payment card network information and financial institution Website registration with a payment card network information, the database can be adapted to collect, store, organize, and/or provide other legitimacy information relating to Websites and the like. Examples of such additional information can include a wide range of indicia, which in turn can relate to the quality of content of a Website, page, or portion thereof; to behavior or other actions engaged in by a Website or the host thereof; to attributes of the Website or the host; or other attributes of the site. Such information can include information relating to spam, adware, spyware, cookies, viruses, phishing, spoofing, worms, illegal activities, immoral activities, illicit activities, improper business practices, age inappropriate material, gambling, location of provider, corporate information, post office box, false phone number, misleading phone number, phone number location, duration of registration, location of registration, better business bureau information, Website reference information, Website quality listing, VeriSign listing, analysis of links to the Website, analysis of links from the Website, treatment of information, treatment of personal information, names, addresses, phone numbers, social security numbers, portion of social security number, credit card number, bank number, pin, mother's maiden name, spouse's name, license number, immigration information, purchase information, username, password, password for the Website, mortgage amount, car loan amounts, loan information, loan application information, and income.

Such information can also include information relating to downloading of content, downloading of unwanted content, downloading of spyware, downloading of malware, downloading of viruses, downloading of worms, downloading of programs, downloading of executable files, downloading of ActiveX, downloading of unexpected content, downloading of Java, downloading of JavaScript, downloading of VBscript, downloading of Flash, downloading of a media player, downloading of a player, downloading of a Webpage containing Web browser "exploits," misdirection, misleading information, trademarks, trade dress, service marks, trade names, brand name confusion, false information, metadata patterns, corporate addresses, how long the company has been in existence, how long the Website has been in existence, whether a company has an IP address in a range of addresses with a poor legitimacy or reputation, existence of a trademark, whether a company is a spammer, popularity ranks, ranking of the corporation (such as based on existence within Fortune 1000, Fortune 500, Fortune 100, Fortune 50, and Fortune 10), false corporate ownership information, misleading call information (e.g., whom or what a call will reach), higher ranked similar sites, famous trademarks, whether the Website owns a registered trademark (e.g., federal, local, or international), whether the Website has certificates, whether the Website is similar to one with a famous trademark, decoy sites, valid addresses (e.g., corporate and or Website reference), valid phone numbers (e.g., corporate and or Website reference), valid e-mail addresses (e.g., corporate and or Website reference), valid contact information, addresses that correspond with a phone number and or the phone number presented, how long the Website has existed, where the Website is hosted, what IP ranges the Website IP address is in, whether the Website asks for personal information, whether it requests personal information, where on the Website a site asks for personal information, whether the Website sends e-mail related to the content on the Website (e.g., it can be acceptable for an adult Website to send adult content e-mails, but it cannot be acceptable for a lottery Website to send adult content e-mails), whether the Website adheres to common security practices (e.g., uses SSL, etc) or the like.

Each one of these factors can be used as a basis for assessing the legitimacy of a Website, a page, or a portion thereof, such as in association with a payment cardholder's interaction with the same. While certain embodiments have been identified, the information can encompass any type of information that can be used to derive an indicator of legitimacy or to serve as such an indicator.

An aspect of the present disclosure relates to systems and methods for collecting and storing in a database and for presenting information relating to the legitimacy or reputation of a Website based at least in part on the practices of the Website, Website owner, Website affiliates, or a party related to the Website. This involves information in addition to merchant Website registration with a payment card network information and financial institution Website registration with a payment card network information. In embodiments, systems and methods involve presenting indicia of a Website's legitimacy or reputation to a payment cardholder attempting to interact with the Website, wherein the legitimacy is at least in part based on practices associated with the Website. The practices can relate to the treatment of personal information. The treatment can be based, at least in part, on a historical treatment of personal information, reputation of personal information treatment, and a policy related to the treatment of personal information.

In embodiments the personal information can involve one or more or a combination of the following: name, address, phone number, social security number, portion of social security number, credit card number, bank number, pin, mother's maiden name, spouse's name, license number, immigration information, purchase information, username, site user name, mortgage amount, car loan amount, loan amount, income, or other personal information.

In addition to registration of a merchant Website or financial institution Website with a payment card network, the practices can relate to the Website's legitimacy or reputation, actual performance, perceived performance, or other indicia related to the site's downloading of undesirable, unintended, or otherwise unwanted content. The unwanted content can include, for example, spyware, information not indicated or identified by the Website, information not overtly indicated or identified by the Website, information hidden on the Website, harmful software, malware, inappropriate content, downloadable file(s), a program, HTLM, ActiveX, an executable file, JavaScript, VBScript, Flash, Java, or other such content.

The practices can relate to misdirecting users or payment cardholders. The misdirection can be based, at least in part, on a trade address, trademark, service mark, service, product, graphics, text, video, a similar URL, or other such information used to misdirect users or payment cardholders. For example, a Website with a poor reputation can steal text or graphics from a legitimate Website and pass them off to be their own, or such a Website can choose a URL that is similar to another's URL to misdirect the Web traffic to their site.

The practices can relate to a corporate reputation of a business associated with the Website. For example, the corporate reputation can be based, at least in part, on the corporate address, how long the company has been in existence, how long the Website has been in existence, whether they have an IP address in a range of addresses with a poor reputation, existence of a trademark, whether they are a spammer, popularity rank, better business bureau rating, ranking of the corporation (based on existence within Fortune 1000, Fortune 500, Fortune 100, Fortune 50, Fortune 10), or other corporate information. The corporate reputation can be based, at least in part, on two or more of the following pieces of corporate information: corporate address, how long the company has been in existence, how long the Website has been in existence, whether they have an IP address in a range of addresses with a poor reputation, existence of a trademark, whether they are a spammer, popularity rank, better business bureau rating, and ranking of the corporation (based on existence within Fortune 1000, Fortune 500, Fortune 100, Fortune 50, and Fortune 10). The corporate reputation can be based, at least in part, on a plurality of factors including one or more of the following or any combination of the following: corporate address, how long the company has been in existence, how long the Website has been in existence, whether they have an IP address in a range of addresses with a poor reputation, existence of a trademark, whether they are a spammer, popularity rank, better business bureau rating, and ranking of the corporation (based on existence within Fortune 1000, Fortune 500, Fortune 100, Fortune 50, and Fortune 10).

In embodiments, the practices relate to providing misleading information on the Website. The misleading information can involve providing a false phone number, false address, false corporate ownership information, or other false, misleading, or temporary information. In embodiments, the practices relate to a date of establishing the Website, a date of establishing a corporation associated with the Website, the location of the corporation, location of the server servicing the Website, or other such information.

Information relating to these practices can be included in the database along with the merchant Website registration with a payment card network information and financial institution Website registration with a payment card network information. Such information will allow the payment cardholder to better assess the overall legitimacy of the Website.

The proxy interaction involving a payment cardholder computer system executing a browser application with an item of content associated with the merchant Website of this disclosure can also operate in coordination with another protection program, such as a virus protection program, a spam filter, a content filter, a parental control program, a spyware removal program, and/or a firewall, or any combination thereof.

If a Website has a reputation of downloading viruses or other malware, the proxy interaction of this disclosure can operate in coordination with a virus protection program to target any such undesired content that can have been downloaded to the payment cardholder. Alternatively, or in addition, the virus program can be used during any such Website interactions to identify and protect the payment cardholder. In embodiments, the virus program can operate in a targeted fashion during any interaction with the Website. In embodiments, the antivirus software is adapted to scan hard drives for malware and the like. In embodiments, the antivirus software can be periodically updated. In embodiments, the antivirus software can be adapted to check downloads before they are installed, as they are being installed, or after they are installed.

The proxy interaction of this disclosure can be associated with a spam protection facility (e.g., spam filter software residing on the payment cardholder computing device). In embodiments, the spam protection facility can filter spam, prevent address harvesting by keeping payment cardholders from entering information on a Website, identify spam, report spam, provide content based filtering (e.g., looking for e-mail that contains links to low legitimate Websites as an indicator that this is unwanted e-mail), provide statistical filtering, provide check-sum filtering, provide authentication, provide or verify keys, perform Heuristic filtering, set honey pots, or perform other such activities.

The proxy interaction of this disclosure can be associated with a spyware protection facility (e.g., spyware software resident on the payment cardholder's computing device). In embodiments, the spyware protection can be anti-spyware, a spyware filter, IE favorites addition notification, or spyware identification technology, and it can search hard drives, report spyware, and the like.

The proxy interaction of this disclosure can be associated with a firewall facility (e.g., hardware of software firewalls). In embodiments, the firewall facility can invoke security policies, such as using a database of known acceptable programs that should be allowed to use the network and non-acceptable programs that should not be allowed to use the network. The firewall facility can further be adapted to protect personal information by keeping the payment cardholder from entering certain Websites in addition to blocking personal information from being transmitted from the payment cardholder by checking packets as they're sent from the payment cardholder. The firewall facility can further be adapted to protect against unauthorized uses or unauthorized payment cardholders.

In embodiments, the proxy interaction of this disclosure, the several protection facilities, virus protection program, a spam filter, a spyware program, and or a firewall can operate in a coordinated fashion. The coordination can involve one or more of the protection facilities. For example, the proxy interaction of this disclosure can detect a payment cardholder interaction with a poor reputation Website, and one or more of the other protection facilities (e.g., virus protection program, a spam filter, a spyware program and or a firewall) can be employed to provide its protection service.

In embodiments, the proxy interaction of this disclosure can be associated with a Web filtering facility adapted to identify content, prevent content, notify of content, or perform other like activities. In embodiments, the proxy interaction of this disclosure can be associated with a phishing facility adapted to filter phishing, identify phishing activities, identify legitimate sites (e.g., using a white list of known good sites), or provide other like services.

Another aspect of the present disclosure relates to the timing of the presentation of warnings and other such legitimacy-based actions. In embodiments, the warnings, recommendations, and indicia of legitimacy and the like are provided at the time of the attempted interaction or when the opportunity for an interaction is presented. For example, when a payment cardholder enters a URL in an address bar of a browser, the payment cardholder can be presented with legitimacy-based services even before the payment cardholder's computing device is connected to the intended site. This can happen by a process involving various steps, including allowing the payment cardholder to enter the URL, and comparing the URL to known URLs with associated legitimacy information, and then either providing information relating to the URL or allowing the browser to continue the action of connecting to the site.

In other embodiments, the payment cardholder can be presented with a Website that includes the opportunity for a payment cardholder to enter information, such as queries, personal information, e-mail address information, credit card information, passwords, or the like, and the payment card network can alert the payment cardholder with indicia of the Website's legitimacy as the site is presented. This can be done through a Website comparison with information and/or through a review of what is being asked for on the page. When information requests are found, the page, content, site, or affiliated company can be assessed for legitimacy or reputation, and an indicator of the legitimacy or reputation can be presented to the payment cardholder, or other legitimacy services can be provided.

In an embodiment, the methods and systems of this disclosure can be associated, for example, with one or more of an electronic commerce interaction, an electronic auction interaction, a word processing interaction, a downloading interaction, a purchase, a sale, an offer, a publishing action, a syndication action, an aggregation action, a shopping interaction, reverse auction interaction, an advertising interaction, or other interaction.

In embodiments, the method of this disclosure can provide information, prevent access, or otherwise interact during an attempted Website interaction. For example, the method of this disclosure can interact with a search, search engine search results, opening of Website, use of Website, viewing banner advertisement, interacting with banner advertisement, or at another point in the process. As another example, the method of this disclosure can interact during a mobile communication facility (e.g., a cell phone or PDA) interaction while accessing a Website, viewing a menu bar, making a phone call, or at another point in the process of interacting with the Website through a mobile communication facility. As another example, the method of this disclosure can interact during an interaction with the Web during activities in other software applications such as a word processor (e.g., Word, etc.), presentation software (e.g., PowerPoint, etc.), collaboration software (e.g., Lotus notes, etc.), spreadsheet software, business process management software, database software (e.g., PeopleSoft, SAP, Oracle, Sybase, IBM, open source), human resources software, supply chain/ordering/inventory software, purchasing software, or other software applications.

The electronic commerce system can be characterized in part as one or more computing services that provide electronic commerce functionality either to e-commerce sites or directly to consumers. This can include, for example, electronic commerce procedures pertaining to one or more of the following: a sale of a good or service, a transaction, and/or a communication of information. E-commerce-related services can be deployed as integrated services such as a shopping Website, or the services can be deployed in any number of configurations. For example, individual services can include a shopping cart, a credit card transaction engine, a product search engine, and a price or feature comparison engine, and so on, all of which can be combined in a deployment of an e-commerce Website. It should be appreciated that a plurality of computing services can be provided concurrently or sequentially to support a particular transaction or user experience. It should also be appreciated that computing services can be delivered to multiple users and/or multiple instances of a single user with techniques such as multiprocessing, multithreading, and/or distributed computing.

Website legitimacy services in accordance with this disclosure can be combined with e-commerce-related computing services in a variety of ways to achieve legitimacy-based electronic commerce systems. A number of such combinations are discussed in more detail below.

The computing services can relate to sale of goods or services and Websites associated therewith. This can include, without limitation, the following generally recognized categories of goods and services: adult, apparel, audio and video, automotive, baby, baby registry, wedding registry, beauty, bed and bath, books, camera and photo, cell phones and service, computer and video games, computers, digital books, DVDs educational electronics, financial services, friends and favorites, furniture and decor, food, gourmet food, health and personal care, home and garden images, information, jewelry and watches, magazine subscriptions, maps, movie show times, music, musical instruments, office products, outdoor living, pet supplies, pharmaceuticals, real estate, shoes, software, sports and outdoors, tools and hardware, toys and games, travel, video, weather, wish list, and/or yellow pages.

Legitimacy services in accordance with this disclosure can be employed to evaluate a Website or domain that offers goods and/or services for sale. By way of a non-limiting example, a legitimacy service can intervene before user navigation to a Website that is known to generate large numbers of pop-ups. Legitimacy services can also, or instead, be employed to evaluate sources of content within a reseller Website. Thus, for example, a travel Website can provide links to various travel agents and/or providers such as car rental companies, airlines, and hotels. As described above, a legitimacy service can evaluate the Website based upon an aggregated evaluation of providers listed on the Website, or the legitimacy service can operate to provide legitimacy or reputation information for specific providers when hyperlinks are selected. In one embodiment, a browser plug-in can operate to evaluate hyperlinks, and to embed reputation-based icons within a page during rendering so that a user or payment cardholder receives immediate, visual feedback concerning legitimacy for a number of providers that have links in a page such as a directory.

The computing services can support transactions including, without limitation, one or more of the following: one-click shopping, an auction, an authentication, a "buy now" operation, a shopping cart operation, a currency transaction or exchange, a digital rights management operation, a payment, a permission, a micropayment, a cryptographic key generation or distribution, an encryption, and/or an identity or authority verification, and Websites associated therewith. Legitimacy services can be invoked in a transaction context in a number of ways. Legitimacy services in accordance with this disclosure can be used with reference to a Website. An additional set of legitimacy analyses, such as a more stringent evaluation or an evaluation of reputation data specific to the transaction type, can be conducted when a transaction is initiated. In addition, where the transaction is supported by a third party, such as for payment or delivery, reputation data can be provided for the third party.

It should be understood that the embodiments described herein can relate to an interaction with a Website, portion of a Website, content associated with a Website, content accessible through a network, information accessible through a network, a network accessible item, virtually any other network interaction, interactions with user interfaces, interactions with software applications, interactions with objects that are embedded in user interfaces or software applications (e.g., embedded URLs, links, or the like), or interactions with data or metadata that represent or are derived from or that relate to any of the foregoing.

While e-commerce has been discussed, and other examples of useful environments for legitimacy services have been provided, numerous additional applications exist. In general, the legitimacy systems and methods in accordance with this disclosure can be usefully invoked in any environment where users might benefit from legitimacy information. This can include, for example, search and download of privacy and security software, such as anti-spyware software, anti-virus software, anti-spam software, security software, file sharing software, music sharing software, video sharing software. This can also include interactions with Websites for charitable donations, intermediaries for financial transactions, and Websites that purport to provide legitimacy data, such as Websites aimed at discouraging users from entering into financial transactions with a company who's product does not work well or that have poor user ratings. Another useful application of legitimacy services can be to prevent inadvertent navigation to sites that knock-off well known company names, brands, or URLs with near facsimiles intended to confuse consumers.

Similarly, while many of the embodiments herein are described in connection with browser interfaces, it should be understood that legitimacy services can be used with any software that interacts with content through a network, including open source (e.g., Mozilla, Firefox, or other open source browser), peer-to-peer (e.g., Kazaa, or a similar peer-to-peer program), proprietary (e.g., Microsoft's Internet Explorer or Apple's Safari), platform specific (e.g., using a protocol designed for a particular device), or other software, platforms, or configurations. For example, a mobile communication facility (e.g., a cell phone) can use proprietary, platform-specific, code to interface with the Internet in a manner that could benefit from the legitimacy services provided herein.

More generally, the legitimacy-based systems and methods in accordance with this disclosure can be usefully applied in a wide range of network-based and computer-based environments, and Websites associated therewith. For example, legitimacy systems can be applied in the context of peer-to-peer networks or other file sharing and/or socially oriented environments such as systems for searching and sharing screen savers, music, song lyrics, TV shows, movies, DVDs, CDs, DVD ripping and burning software, CD ripping and burning software, video clips, smiley faces, fonts, backgrounds, themes, skins, celebrity information, wallpaper, cursors, games, contests, ring tones, podcasts, and any other soft content suitable for distribution over a network. The legitimacy service can, in particular, protect users of such peer-to-peer, file sharing, and/or social networks from receiving spyware, adware, or other malware, as well as protect users from being added to an e-mail spam list, becoming a victim of a browser, application, or operating system exploit, or being otherwise subjected to security and privacy risks in a network environment.

All such modifications and adaptations as would be clear to one of skill in the art are intended to fall within the scope of the systems and methods described herein.

Although embodiments of phishing detection and notification have been described in language specific to structural features and/or methods, it is to be understood that the subject of the appended claims is not necessarily limited to the specific features or methods described. Rather, the specific features and methods are disclosed as exemplary implementations of phishing detection and notification.

The terms "comprises" or "comprising" are to be interpreted as specifying the presence of the stated features, integers, steps or components, but not precluding the presence of one or more other features, integers, steps or components or groups thereof.

It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A system comprising:
   a server;
   an electronic storage device having a database that comprises information regarding whether a merchant website is registered with a payment card network;
   a communication network for allowing access to the server by the payment card network;
   a payment cardholder computer device of a user, the payment cardholder computer device comprises a processor configured for communication with the communication network, wherein the processor is configured to perform operations of:
   accessing the merchant website to initiate a non-fictitious shopping browser session for a real transaction;
   initiating a proxy browser session at the merchant website automatically upon accessing of the merchant website;
   adding a random item to a shopping cart of the merchant website automatically as part of the proxy browser session;
   automatically commencing a fictitious proxy checkout from the proxy browser session to initiate an authorization request by the payment card network;
   receiving, in the shopping browser session, a result of the authorization request, wherein the result is whether the merchant website is authorized by the payment card network; and
   notifying the user of the result by displaying a visual cue on the payment cardholder computer device wherein, if the result is a notice that the merchant website is a phishing website that is not connected to the payment card network, the processor further performs operations of: preventing the user from inputting information in the shopping session, thereby preventing a phishing; and
   wherein, if the result is that the merchant website is an authorized website that is connected to the payment card network, the system authorizes a real transaction through the shopping browser session.

2. The system of claim 1, wherein the information comprises a white list of merchant Websites registered with a payment card network and a black list of merchant Websites not registered with a payment card network.

3. The system of claim 1, wherein the server is a Domain Name System (DNS) server.

4. The system of claim 1, wherein the communication network is an intranet or Internet.

5. The system of claim 1, wherein the fictitious checkout comprises using a fictitious card number, payment cardholder name, and payment cardholder address.

6. The system of claim 5, wherein the fictitious card number is for a one-time use and comprises a string of sixteen numbers.

7. The system of claim 1, wherein the authorization request is routed from the proxy session to an acquirer, to a payment card network, and then to an issuer.

8. The system of claim 1, wherein the result of the authorization request is routed from an issuer to the payment card network, to an acquirer, and then to the shopping session.

9. The system of claim 1, wherein the proxy session is initiated by a web browser, a web browser plug-in, or a web browser add-in.

10. The system of claim 1, wherein the result is a confirmation that the merchant website is connected to the payment card network and not a phishing website.

11. The system of claim 1, wherein the item is selected at random from an inventory available on the merchant website.

12. A system comprising:
   a server and electronic storage device having a database that comprises information regarding whether a financial institution website is registered with a payment card network;
   a communication network for allowing access to the server by the payment card network; and
   a payment cardholder computer device comprising a processor that is configured for communication with the communication network, wherein the processor performs operations of:
   accessing the financial institution website to initiate a non-fictitious shopping browser session for a real transaction;
   initiating a proxy browser session at the financial institution website upon accessing the financial institution website;
   adding an item to a shopping cart of the financial institution website automatically as part of the proxy browser session;
   automatically commencing a fictitious proxy checkout to initiate authorization request by the payment card network from the proxy browser session, wherein the fictitious proxy checkout is not completed;
   receiving, in the non-fictitious shopping session, a result of the authorization request, wherein the result is whether the merchant website is authorized by the payment card network;
   notifying the user of the result by displaying a visual cue on the payment cardholder computer device;

wherein, if the result is a notice that the merchant website is a phishing website that is not connected to the payment card network, the processor further performs operations of: preventing the user from inputting information in the shopping session, thereby preventing a phishing; and wherein, if the result is that the merchant website is an authorized website that is connected to the payment card network, the system authorizes a real transaction through the non-fictitious shopping browser session.

13. The system of claim 12, wherein the information comprises a white list of financial institution Websites registered with a payment card network and a black list of financial institution Websites not registered with a payment card network.

14. The system of claim 12, wherein the server is a Domain Name System (DNS) server.

15. The system of claim 12, wherein the communication network is an intranet or Internet.

16. The system of claim 12, wherein the fictitious checkout comprises using a fictitious card number, payment cardholder name, and payment cardholder address.

17. The system of claim 16, wherein the fictitious card number is for a one-time use and comprises a string of sixteen numbers.

18. The system of claim 12, wherein the fictitious checkout creates an authorization request that is routed from the proxy session to an acquirer, to a payment card network, and then to an issuer.

19. The system of claim 12, wherein the result of the authorization request is routed from an issuer, to the payment card network, to an acquirer, and then to the shopping session.

20. The system of claim 12, wherein the proxy session is initiated by a web browser, a web browser plug-in, or a web browser add-in.

21. The system of claim 12, wherein the result is a confirmation that the financial institution website is connected to the payment card network and not a phishing website.

* * * * *